Figure 1:
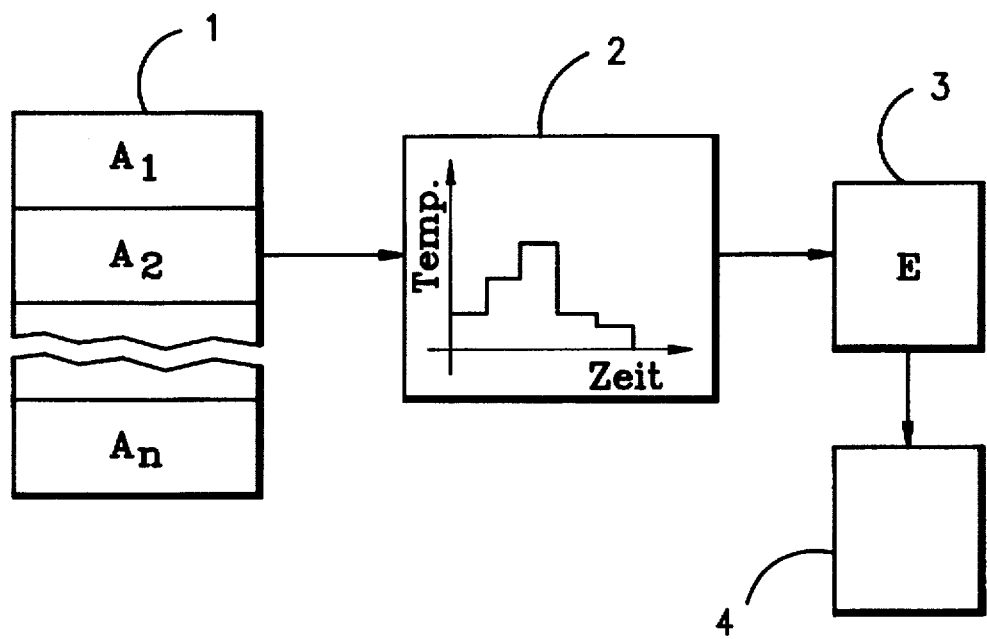

United States Patent [19]
Schwenk et al.

[11] Patent Number: 5,795,379
[45] Date of Patent: Aug. 18, 1998

[54] PIGMENTS AND A METHOD FOR PRODUCING THEM

[75] Inventors: Gerhard Schwenk, Punchheim; Ulrich Scholz, Munich; Ulrich Magg, Feldgeding; Johannes Leist, Munich, all of Germany

[73] Assignee: Giesecke & Devrient GmbH, Munich, Germany

[21] Appl. No.: 742,161

[22] Filed: Nov. 1, 1996

[30] Foreign Application Priority Data

Nov. 3, 1995 [DE] Germany ............ 195 41 054.8

[51] Int. Cl.$^6$ ............................................ C08K 5/00
[52] U.S. Cl. .................... 106/499; 106/241; 106/272; 523/137
[58] Field of Search .......................... 106/499, 241, 106/272; 523/137

[56] References Cited

U.S. PATENT DOCUMENTS

| | | | |
|---|---|---|---|
| 3,741,907 | 6/1973 | Beyerlin | 252/301.2 R |
| 5,052,380 | 10/1991 | Polta | 128/90 |

FOREIGN PATENT DOCUMENTS

| | | |
|---|---|---|
| 1609913 | 11/1985 | European Pat. Off. . |
| 292702 | 11/1988 | European Pat. Off. . |
| 2063948 | 7/1972 | Germany . |
| 1174308 | 12/1969 | United Kingdom . |

*Primary Examiner*—Deborah Jones
*Attorney, Agent, or Firm*—Bacon & Thomas

[57] ABSTRACT

The invention relates to a pigment composition having a dye and a solid resin, the dye being bound in a solid resin. The resin is produced as the reaction product from an oligomerized polyisocyanate and a mixture of polyfunctional compounds with active hydrogen.

21 Claims, 1 Drawing Sheet

# PIGMENTS AND A METHOD FOR PRODUCING THEM

This invention relates to a pigment composition having a dye and a solid resin, the dye being bound in the solid resin.

For producing inks or colors it is often first necessary to embed the dyes used in a solid resin layer, thereby fixing them in the resin. This increases the color fastness of the dye used. The dye-containing resins can then be ground finely into pigments and added to the particular binders to produce colors so that the desired inks arise.

Such a pigment is known for example from DE-OS 20 63 948 (U.S. Pat. No. 3,741,907). This print describes the production of a fluorescent pigment whereby a fluorescent dye is mixed into a resin. The resins used are ones produced by polyaddition of a low-molecular polyol with a monomeric aliphatic and/or monomeric cycloaliphatic diisocyanate and optionally further components. For producing the pigment the fluorescent dye and the other components, the polyol and the diisocyanate, are mixed and crosslinked with an exothermic reaction course.

However the use of such resins has the disadvantage that the diisocyanates used as starting materials involve considerable health risks so that high safety requirements must be met during processing. For example these substances are toxic when inhaled.

The problem of the invention is accordingly among other things to propose a pigment and a method for producing it whereby the production process is unobjectionable in terms of safety and industrial medicine, the pigment is producible by a continuous manufacturing process and has improved quality properties.

This problem is solved according to the invention by the features stated in the independent claims.

The basic idea of the invention is to produce the pigment by binding a dye in a resin, the resin being produced from the reaction of solid, oligomerized diisocyanates and a mixture of polyfunctional compounds with active hydrogen. The inventive method uses a reaction unit which allows passage of the bulk blend of the abovementioned starting materials. The use of oligomerized polyisocyanates in lieu of conventionally used monomeric diisocyanates results in a number of advantages. For example it permits the process to be conducted unobjectionably in terms of safety and industrial medicine since this starting material is not known to involve any special dangers up to now. If the reaction is conducted as a continuous process it is possible to influence the process by varying the process parameters such as process time, mixing rate or the like. One can thus control the degree of polymerization of the reaction mixture and thus the hardness of the produced resin. By additionally providing heating zones in the process unit one can adjust a temperature profile with which the reaction can furthermore be adjusted optimally to the desired final product.

In a preferred embodiment the pigment is produced by binding a dye in a resin whereby the oligomerized polyisocyanate used is a trimerized diisocyanate, preferably a derivative of isophorone diisocyanate. This trimerized diisocyanate is mixed with a diamine or polyamine and fed to a worm extruder together with the dye. In the worm extruder the mixture passes through a temperature profile which is realized by providing different heating zones in the extruder. After the reaction time a tough product emerges at the end of the extruder, subsequently being comminuted to the necessary pigment size in a comminuting unit.

The properties of the final product can be influenced via the process parameters in the extruder. It is furthermore possible to feed to the mixture a so-called chain stopper which preferably consists in a monofunctional compound with active hydrogen and is preferably selected from the group of amines or amides.

Further advantages and advantageous embodiments can be found in the description of the following figures, which are deliberately not true to scale in order to be easier to understand.

FIG. 1 shows a schematized representation of the reaction course in the inventive production method.

FIG. 1 schematically describes the reaction course of the inventive method. Starting materials $A_1$ to $A_n$ necessary for producing the pigment are brought together in unit 1 and optionally already mixed. The starting materials are at least an oligomerized polyisocyanate, a dye and a polyfunctional compound with active hydrogen. The oligomerized polyisocyanate is preferably a trimerized diisocyanate, in particular a derivative of isophorone diisocyanate.

The polyfunctional compound with active hydrogen is usually selected from the group of amines, amides, alcohols and carboxylic, sulfonic and phosphonic acids. One preferably uses urea, melamine, sulfamide, sulfanilamide, aminobenzamide and derivatives thereof. These starting materials are mixed homogeneously into a bulk blend and fed to reaction unit 2, in particular a worm extruder. In reaction unit 2 the bulk blend is mixed further and passes through a temperature profile which starts the reaction process of the oligomerized polyisocyanate with the polyfunctional compounds into the desired solid resin, the dye being bound in the arising resin at the end of this process.

This procedure leads to final product E which is substantially a solid resin with a bound dye and is collected in a vessel or means of transportation. Final product E is then fed to further processing unit 4 in which the final product is comminuted to pigment size. One preferably uses a mill with which the desired pigment size can be adjusted.

The dyes suitable for use are basically subject to no restrictions so that a wide assortment of dyes can be used for producing the pigments. For example fluorescent dyes can be employed for producing fluorescent pigments, whereby in particular chelates from the group of rare earths can be used. However other functional dyes, for example daylight luminous dyes, thermochromic or photochromic dyes and infrared-absorbent or infrared-fluorescent dyes, can also be used individually or in combination with each other. One can use dyes which absorb one or more wavelengths from the visible spectral region, or reagent dyes which change one of their properties under certain conditions, such as the influence of a certain radiation or the presence of other reagents.

Final product E must at least after cooling have a brittleness which is great enough to permit grinding to the necessary pigment fineness in comminuting unit 4. By varying the starting materials as well as the reaction parameters in unit 2 one can thus influence the properties of final product E to such an extent as to achieve an optimal result for the particular case of application.

These pigment particles can then be added to a binder in the desired concentration so that versatile inks arise.

Alongside many other possible applications, the fluorescent pigments can be employed in particular in inks which are used in security-relevant areas. One prints these inks on data carriers, such as security documents, papers of value, bank notes, identity cards or security-relevant cards, to obtain a marking or protection of such documents.

However a thus produced ink can also be used in other areas to provide data carriers with an authenticity marking. For example one can mark the packages of special high-quality products or these products themselves using the inventive ink so as to permit their authenticity to be proven at any time. Marking products can be advantageous in many cases, in particular in areas in which imitation of the products or product piracy is already possible using simple means. Well-known examples include marking the packaging of EDP programs, diskettes, CDs or other high-quality articles of sale.

In the following the inventive method and the inventive coloring pigment will be explained further using some examples.

EXAMPLE 1

Starting materials:

62.75 mass % oligomerized diisocyanate 9.89 mass % melamine 12.36 mass % p-toluenesulfonamide 15.00 mass % CD331 fluorescent dye The stated components are added to an extruder as a powder mixture via a metering device. Synthesis takes place by reaction extrusion at an extruder temperature of 220° C.

EXAMPLE 2

Starting materials:

56.37 mass % trimerized diisocyanate 10.07 mass % melamine 18.56 mass % benzamide 15.00 mass % CD331 fluorescent dye The components are added to an extruder as a powder mixture via a metering device. Synthesis takes place by reaction extrusion at an extruder temperature of 210° C.

EXAMPLE 3

Starting materials:

62.78 mass % trimerized diisocyanate 11.21 mass % melamine 20.67 mass % benzamide 5.34 mass % Uvitex OB fluorescent dye The components are added to an extruder as a powder mixture via a metering device. Synthesis takes place by reaction extrusion at an extruder temperature of 210° C.

EXAMPLE 4

Starting materials:

60.60 mass % trimerized diisocyanate 10.84 mass % melamine 9.56 mass % benzamide 4.00 mass % urea 15.00 mass % C335 fluorescent dye The components are added to an extruder as a powder mixture via a metering device. Synthesis takes place by reaction extrusion at an extruder temperature of 260° C.

In the above examples the dye content can also be varied so as to produce fluorescent pigments with dye content F where $0<F\leq 50\%$. The particular synthesis product resulting from each example can be used as a printing pigment.

We claim:

1. A pigment composition comprising a dye and a solid resin, the dye being bound in the solid resin, wherein the resin is a reaction product from an oligomerized polyisocyanate and a mixture of polyfunctional compounds with active hydrogen.

2. The pigment composition of claim 1, wherein the mixture additionally contains a chain stopper.

3. The pigment composition of claim 1, wherein the oligomerized polyisocyanate is a trimerized diisocyanate.

4. The pigment composition of claim 1, wherein the polyfunctional compound with active hydrogen is selected from the group of amines, amides, alcohols and carboxylic, sulfonic and phosphonic acids.

5. The pigment composition of claim 2, wherein the chain stopper is selected from the group of monofunctional, hydrogen-active compounds.

6. The pigment composition of claim 1, wherein the dye is a fluorescent dye.

7. The pigment composition of claim 1, wherein the dye is selected from the group consisting of a daylight luminous dye, a thermochromic dye, a photochromic dye, an infrared-absorbent dye, an infrared-fluorescent dye and mixtures thereof.

8. The pigment composition of claim 1, wherein the dye absorbs a wavelength of the visible spectral region.

9. A method for producing a pigment composition comprising a dye and a solid resin, the dye being bound in the solid resin, said method comprising the steps of mixing the dye with an oligomerized polyisocyanate and a polyfunctional, hydrogen-active compound and reacting the dye, the polyisocyanate and the hydrogen-active compound into a solid resin in a reaction unit applying heat, comminuting the resin to the desired pigment size in a comminuting unit.

10. The method of claim 9, wherein a chain stopper is added during mixing.

11. The method of claim 10 wherein the olygomerized polyisocyanate and the chain stopper are mixed as powders form into a bulk blend in a heavy-duty mixer.

12. The method of claim 11, wherein the bulk blend is reacted in an extruder having a plurality of heating zones.

13. The method of claim 9, wherein the comminuting unit is a mill.

14. The method of claim 9, wherein the dye is a fluorescent dye from the group of rare earth chelates.

15. The method of claim 9, wherein the dye is selected from the group consisting of a daylight luminous dye, a thermochromic dye, a photochromic dye, an infrared-absorbent dye, an infrared-fluorescent dye and mixtures thereof.

16. The method of claim 9, wherein the dye absorbs at least one wavelength of the visible spectral region.

17. The pigment composition of claim 3 wherein the trimerized diisocyanate is a derivative of isophorone diisocyanate.

18. The pigment composition of claim 4 wherein the polyfunctional compound with active hydrogen is selected from the group consisting of urea, melamine, sulfamide, sulfanilamide, aminobenzamide, thiourea and derivatives thereof.

19. The pigment composition of claim 5 wherein the chain stopper is selected from the group consisting of amines, amides, alcohols, and carboxylic, sulfonic and phosphonic acids.

20. The pigment composition of claim 6 wherein the fluorescent dye is a chelate from the group of rare earths.

21. The method of claim 10 wherein the chain stopper is a monofunctional, hydrogen-active compound.

* * * * *